United States Patent Office 2,957,799
Patented Oct. 25, 1960

2,957,799

ALKYL SULFOXIDE COMPOUNDS FOR INSECT COMBATING AND METHOD

Lyle D. Goodhue, Roy E. Stansbury, and Rector P. Louthan, Bartlesville, Okla., assignors to Phillips Petroleum Company, a corporation of Delaware No Drawing. Filed May 27, 1957, Ser. No. 661,584

37 Claims. (Cl. 167—22)

This invention relates to combating of insects. In one of its aspects, the invention provides certain selected alkyl sulfoxides, as defined herein, as ingredients for insecticidal compositions. In a further aspect, the invention provides one or more of certain selected alkyl sulfoxides as essential active ingredients in insecticidal compositions. In another of its aspects, the invention provides certain selected alkyl sulfoxides, as defined herein, as at least in part replacement materials for pyrethrum in insecticidal or insect combating compositions. In another of its aspects, the invention provides a method for combating insects. In a specific form, the invention provides the insecticidal sulfoxides, as defined herein, also as insect repellent agents. A further specific aspect is in the use of said repellent agents in insect combating compositions which may or may not contain one of the other insecticidal sulfoxides of the present invention.

Insecticidal mixtures are widely used to control flies, roaches and other insects. The field of insecticides is divided broadly into two classifications, agricultural insecticides and household insecticides. While the primary purpose of both of these types of insecticides is to kill the insect, other properties are also desirable, particularly in the household variety of insecticide which is, of course, used within a confined space, or indoors. For example, the housewife is particularly interested in obtaining an insecticide which will quickly cause "knockdown" (paralysis) of flies, etc., even though the insect being attacked does not die for some period of time. The most widely used agent in insecticides which causes "knockdown" of flies and the like is pyrethrum. However, pyrethrum is extremely expensive, and even though very small amounts of pyrethrum are employed, it is advantageous, from an economic standpoint, to reduce the amount of pyrethrums in a given insecticidal mixture if this can be done without decreasing the rate of "knockdown." Numerous agents have been found which can be employed in conjection with pyrethrum which cause faster "knockdown" than either the agent or pyrethrum alone. These agents, commonly referred to as pyrethrum synergists, are doubly beneficial in that they enable one to reduce the amount of pyrethrum necessary to obtain quick "knockdown." Also, repelling of certain insects is an important objective in agriculture, industry and in the household.

It is an object of this invention to provide insect combating agents. Another object is to provide insecticides. It is a further object of this invention to provide additives for insecticides. It is another object of this invention to provide a method for combating insects. Another object of the invention is to provide insect repellents. It is a further object of this invention to provide a method for repelling insects. It is a still further object of this invention to provide certain repellents for use in insect combating compositions. A further object still is the provision of a replacement agent for pyrethrum.

Other aspects, objects and several advantages of the invention are apparent from a study of this disclosure and the appended claims.

It has now been discolvered that the selected sulfoxide compounds, defined herein, are effective insect combating agents, such as insecticides and repellents, as well as additives for insect combating compositions, as more fully specified and described herein.

According to the invention, there is provided a method of combating an insect which comprises applying to the place at which said insect may be present an effective quantity of at least one compound having the following structural characteristics

wherein $R_1$ is an n-alkyl radical having 1–12 carbon atoms, $R_2$ is a radical selected from the group consisting of n- and secondary alkyl radicals having 1–8 carbon atoms and wherein the total carbon atoms in $R_1$ and $R_2$ are in the range 7–13, inclusively.

Also, according to the invention and as a more specific feature thereof, there has been provided a method for combating insects by repelling the same, especially for repelling houseflies and roaches, which comprises applying to the place at or within the confined space in which said insect may be present an effective quantity of at least one compound selected from the group consisting of the following sulfoxides:

| | |
|---|---|
| n-Butyl n-propyl | Methyl n-nonyl |
| Ethyl n-hexyl | sec-Octyl ethyl (crude) |
| di-n-Butyl | n-Butyl n-heptyl |
| n-Heptyl methyl | n-Amyl n-hexyl |
| n-Amyl n-propyl | n-Octyl n-propyl |
| n-Amyl n-butyl | n-Decyl methyl |
| n-Propyl n-hexyl | n-Nonyl ethyl |
| Ethyl n-heptyl | di-n-Hexyl |
| Methyl n-octyl | n-Butyl n-octyl |
| di-n-Amyl | n-heptyl n-amyl |
| n-Butyl n-hexyl | Methyl n-undecyl |
| n-Heptyl n-propyl | n-Decyl ethyl |
| Ethyl n-octyl | n-Dodecyl methyl |
| 2-Ethylhexyl ethyl | |

Compositions according to the invention can be made up in usual manner according to prior art knowledge. However, a particularly effective composition is obtained employing deodorized kerosene. Another presently less preferred composition is that obtained employing a substantially odor-free Soltrol (a trademark) which is an isoparaffinic hydrocarbon solvent fraction boiling in the approximate range of 260–800° F. and which preferably has been prepared by hydrofluoric acid alkylation with an olefin under alkylation conditions known in the alkylation art as exemplified in U.S. Patent 2,773,920, issued December 11, 1956, in the names of L. H. Vautrain and E. Strunk. The deodorized kerosene is more preferred because it is capable of imparting better effectiveness to the overall composition. Deodorized kerosene consists primary of aromatic and straight chain aliphatic hydrocarbons and the preferred solvent boils in the range 300–600° F. More preferably the solvent is kerosene which has been deodorized by a process such as steam stripping and boils in the range of about 385–500° F.

The compounds used in this invention are usually effective when employed in a composition in an amount within the range between 0.25 and 15 percent by weight, based on the total composition. Proportions somewhat outside of this range can also be employed, but are not now preferred. When using the compounds according to this invention in an insecticidal composition, it is preferred to employ an amount within the range between 1.0 and 10 weight percent. When the compounds of this invention are employed as replacement for pyrethrum, it is preferred to employ an amount within the range of from 0.25 to 5 weight percent based on the total composition. In compositions containing both pyrethrum and the insecticides of this invention, it is preferred to use a ratio of the compounds used in this invention to the pyrethrum in the range of from 6:1 to 20:1 by weight. A more preferred ratio is in the range of from 8:1 to 10:1. When using the compounds according to this invention for repelling insects, the concentration in the solution in which the compounds are applied usually will be in the range 0.5 to 10 weight percent and preferably will be 1 to 5 weight percent. This is for application in the usual manners.

ployed as agents for killing houseflies which, of course, are sought to be killed in or repelled in or within a house or other confined space.

EXAMPLE I

A number of compounds were tested for insecticidal properties by the following procedure.

An amount of the chemical to be tested was dissolved in a suitable solvent, and a volume of the resulting solution was sprayed into the space confined within a Peet-Grady chamber in which a known number of houseflies were contained. The Peet-Grady chamber is a chamber of 216 cubic feet capacity (6'x6'x6'). The number of flies "knocked down," e.g., paralyzed or dead, was counted at various time intervals, and the total number of flies that were dead at the end of 24 hours was counted. The results of these tests are expressed below as Table I.

In Table I, which follows, the runs employing dimethyl sulfoxides, diethyl sulfoxide, tert-butyl ethyl sulfoxide, di-n-octyl sulfoxide and di-isopropyl sulfoxide are control runs, and represent sulfoxides which are not within the scope of the present invention and which, therefore, are not within the scope of the general formula given in this specification. All other runs employing a dialkyl sulfoxide represent runs within the scope of the invention. The two runs in which pyrethrums and the one run in which lethane were employed are also control runs.

*Table I*

| Chemical Tested | Amt. of Solution Sprayed, cc. | Solvent Used | Wt. percent Chemical in Solution | Percent Flies "Knocked Down" After Time in Minutes | | | | | | | Percent Flies Dead After 24 Hrs. |
|---|---|---|---|---|---|---|---|---|---|---|---|
| | | | | 2 | 4 | 5 | 6 | 8 | 10 | 15 | |
| Di-n-butyl sulfoxide | 10 | Deodorized kerosene | 15.0 | | | 94 | | | 99 | 100 | 91 |
| Do | 10 | ---do--- | 12.1 | | | 94 | | | 100 | 100 | 44 |
| Do | 12 | ---do--- | 3.68 | 52 | 90 | | 93 | 96 | 100 | | 35 |
| Di-n-amyl sulfoxide | 12 | {1 ml. cyclohexanone / 10.5 ml deodorized kerosene} | 5.02 | 39 | 70 | | 89 | 95 | 96 | | 53 |
| n-hexyl ethyl sulfoxide | 12 | Deodorized kerosene | 10.1 | 74 | 94 | | 95 | 95 | 96 | | 86 |
| Do | 12 | ---do--- | 5.1 | 36 | 69 | | 76 | 79 | 92 | | 40 |
| Pyrethrum [1] | 12 | ---do--- | 0.616 | | | 60 | | | 92 | | 35 |
| Do [1] | 12 | ---do--- | 0.616 | | 97 | | 98 | 99 | 99 | | 53 |
| Lethane [2] | 12 | ---do--- | 3.68 | 51 | 95 | | 96 | 97 | 98 | | 29 |
| Dimethyl sulfoxide | 12 | Toluene | 9.56 | 0 | 0 | | 0 | 0 | 0 | | 2 |
| Diethyl sulfoxide | 10 | {1 cc. Acetone / 8 cc. Deodorized kerosene} | 12.1 | | | 4 | | | 6 | 8 | 6 |
| t-butyl ethyl sulfoxide | 10 | {1 cc. Acetone / 8 cc. Deodorized kerosene} | 12.1 | | | 18 | | | 22 | 34 | 18 |
| Di-n-octyl sulfoxide | 12 | {2 ml. cyclohexanone / 9 ml. Deodorized kerosene} | 9.91 | 1 | 9 | | 19 | 28 | 38 | | 6 |
| Di-isopropyl sulfoxide | 12 | Deodorized kerosene | 5.6 | 11 | 17 | | 23 | 26 | 24 | | 5 |

[1] Official test insecticide (OTI) pyrethrum.
[2] Beta-butoxy-beta'-thiocyanodiethyl ether.

The compounds used in the present invention can be applied or used in any of the forms in which insecticides are commonly used. For example, these insecticides can be employed in the form of solutions, emulsions, dusts, wettable powders, aerosols and the like. The preferred method of application of these insecticides is in the form of aerosols, particularly, when the compounds of this invention are being employed as pyrethrum synergists in insecticidal compositions.

When applying the sulfoxides used in this invention, either alone or in combination with other ingredients, in the form of aerosols, they can be dissolved or dispersed in such solvents as naphthas, kerosenes, toluene, cyclohexanone, acetone and the like. These solutions can then be employed in an aerosol bomb in conjunction with a compressible material such as Freon and other similar preferably non-hazardous materials.

The insecticides of this invention are applicable for use in killing such insects as flies, ants, gnats, roaches and the like, although they are particularly effective when em- It will be noted from Table I that dimethyl sulfoxide possesses no knockdown. When diethyl sulfoxide is used, the number of flies apparently knocked down is so slight as to make diethyl sulfoxide worthless as a knockdown agent. Furthermore, it will be noted in Table II that dimethyl sulfoxide in combination with pyrethrum does not exhibit any synergistic action.

EXAMPLE II

A number of runs were made in which several of the compounds tested in Example I were tested in conjunction with pyrethrum in insecticidal mixtures. In these runs, solutions were made up containing 0.03 percent by weight pyrethrum (OTI) and 0.25 percent by weight of the compound to be tested in deodorized kerosene. The specific deodorized kerosene used was Apco 467, manufactured by the Anderson Pritchard Company. This kerosene had the general chemical and physical properties above given for deodorized kerosenes used in the invention. Twelve cubic centimeters of each of these solutions was then sprayed into a Peet-Grady chamber containing a known number of houseflies. The "knockdown" and 24-hour kill were then determined by the procedure described in Example I. The results of these tests are expressed below as Table II.

out by the same procedure described in Example I. In the runs of the following example, the solvent employed was the deodorized kerosene sold under the trade name of Apco 467, described above, unless otherwise indicated by one or more asterisks.

Table III

| Sulfoxides Employed | Amt. Sprayed (cc.) | Actual Gms. Chemical Sprayed | Percent Knockdown in Mins. | | | | | No. of Runs Avgd. | 24-Hour Mortality, percent |
|---|---|---|---|---|---|---|---|---|---|
| | | | 2 | 4 | 6 | 8 | 10 | | |
| Di-n-hexyl | 12 | 0.36 | 42 | 57 | 76 | 84 | 89 | 3 | 26 |
| Do | 12 | 0.24 | 32 | 16 | 66 | 80 | 87 | 1 | 16 |
| n-heptyl methyl | 12 | 0.36 | 65 | 86 | 94 | 95 | 98 | 2 | 12 |
| Do | 12 | 0.24 | 72 | 88 | 93 | 95 | 96 | 2 | 10 |
| Do | 12 | 0.12 | 23 | 29 | 32 | 31 | 35 | 2 | 12 |
| Do | 12 | 0.06 | 14 | 21 | 26 | 31 | 36 | 1 | 13 |
| n-amyl n-propyl | 12 | 0.36 | 52 | 50 | 59 | 63 | 71 | 1 | 10 |
| n-amyl n-butyl | 12 | 0.36 | 49 | 88 | 92 | 94 | 97 | 2 | 32 |
| Do | 12 | 0.24 | 39 | 58 | 74 | 78 | 92 | 3 | 11 |
| n-hexyl n-propyl | 12 | 0.36 | 50 | 94 | 91 | 93 | 95 | 2 | 39 |
| Do | 12 | 0.24 | 27 | 39 | 57 | 82 | 86 | 3 | 3 |
| ethyl n-heptyl | 12 | 0.36 | 75 | 94 | 96 | 97 | 98 | 2 | 30 |
| Do | 12 | 0.24 | 47 | 71 | 76 | 93 | 95 | 2 | 15 |
| methyl n-octyl | 12 | 0.36 | 85 | 97 | 98 | 99 | 99 | 3 | 33 |
| Do | 12 | 0.24 | 71 | 90 | 95 | 96 | 97 | 3 | 26 |
| Do | 12 | 0.12 | 29 | 54 | 60 | 65 | 66 | 2 | 5 |
| Do | 12 | 0.06 | 16 | 31 | 34 | 40 | 42 | 1 | 3 |
| n-butyl n-hexyl | 12 | 0.36 | 47 | 64 | 93 | 96 | 96 | 2 | 26 |
| Do | 12 | 0.24 | 40 | 54 | 86 | 92 | 94 | 2 | 16 |
| n-heptyl n-propyl | 12 | 0.36 | 69 | 90 | 94 | 96 | 97 | 2 | 25 |
| Do | 12 | 0.24 | 35 | 65 | 70 | 78 | 92 | 2 | 11 |
| ethyl n-octyl | 12 | 0.36 | 70 | 92 | 94 | 95 | 97 | 2 | 33 |
| Do | 12 | 0.24 | 57 | 83 | 89 | 90 | 92 | 2 | 12 |
| n-butyl n-heptyl | 12 | 0.36 | 38 | 59 | 86 | 92 | 94 | 2 | 35 |
| Do | 12 | 0.24 | 25 | 37 | 46 | 54 | 71 | 1 | 6 |
| n-amyl n-hexyl | 12 | 0.36 | 52 | 70 | 90 | 95 | 96 | 2 | Not Determined. |
| Do | 12 | 0.24 | 28 | 40 | 46 | 49 | 87 | 1 | 16 |
| n-octyl n-propyl | 12 | 0.36 | 60 | 90 | 95 | 97 | 98 | 2 | 29 |
| Do | 12 | 0.24 | 55 | 65 | 89 | 92 | 94 | 2 | 21 |
| n-decyl methyl | [1] 12 | 0.36 | 25 | 40 | 51 | 81 | 86 | 1 | 28 |
| n-octyl n-butyl | 12 | 0.36 | 29 | 43 | 67 | 80 | 86 | 3 | 39 |
| Do | 12 | 0.24 | 35 | 39 | 49 | 85 | 90 | 1 | 30 |
| Do | 12 | 0.12 | 31 | 39 | 41 | 47 | 76 | 1 | 20 |
| 2-ethylhexyl ethyl | 12 | 0.36 | 52 | 66 | 74 | 80 | 77 | 1 | 38 |
| n-amyl n-heptyl | 12 | 0.36 | 35 | 50 | 84 | 92 | 94 | 2 | 34 |
| methyl n-undecyl | 12 | 0.36 | 31 | 43 | 50 | 59 | 89 | 1 | 35 |
| n-decyl ethyl | 12 | 0.36 | 28 | 35 | 61 | 86 | 92 | 1 | 47 |
| methyl n-nonyl | 12 | 0.36 | 90 | 95 | 98 | 99 | 100 | 2 | 41 |
| Do | 12 | 0.24 | 52 | 89 | 94 | 97 | 98 | 2 | 21 |
| Do | 12 | 0.12 | 36 | 79 | 84 | 87 | 89 | 2 | 8 |
| n-nonyl ethyl | [2] 12 | 0.36 | 64 | 94 | 97 | 98 | 99 | 2 | 41 |
| Crude sec-octyl ethyl | 12 | 0.36 | 45 | 64 | 85 | 91 | 94 | 2 | 16 |
| Di-n-amyl | 12 | 0.36 | 50 | 80 | 92 | 96 | 97 | 2 | 26 |
| Do | 12 | 0.24 | 36 | 48 | 59 | 68 | 90 | 2 | 19 |
| Crude tert-octyl methyl | [3] 12 | 0.36 | 2 | 6 | 4 | 11 | 11 | 1 | 11 |
| Di-n-heptyl | [4] 12 | 0.36 | 30 | 44 | 47 | 49 | 55 | 2 | 32 |

[1] This run employed a solvent comprising a 40 percent (by vol.) solution of Stoddard solvent in deodorized kerosene.
[2] Solvent was 4 percent by vol. cyclohexanone in deodorized kerosene.
[3] Solvent was 10 percent isopropyl alcohol in deodorized kerosene.
[4] This run is an average of two runs, the first of which employed a solvent comprising 5 percent (by vol.) cyclohexanone in deodorized kerosene. The second used a solvent comprising 2 vol. percent cyclohexanone in deodorized kerosene.

Table II

| Compound Tested as Synergist | Percent of Flies "Knocked Down," Time, Min. | | | | | Percent of Flies Dead After 24 Hours |
|---|---|---|---|---|---|---|
| | 2 | 4 | 6 | 8 | 10 | |
| Di-n-butyl sulfoxide | 35 | 73 | 80 | 88 | 95 | 30 |
| n-hexyl ethyl sulfoxide | 58 | 78 | 88 | 95 | 96 | 11 |
| Di-n-amyl sulfoxide | 59 | 91 | 95 | 97 | 99 | 21 |
| Dimethyl sulfoxide | 17 | 33 | 47 | 63 | 67 | 6 |
| Control [1] | 13 | 34 | 43 | 53 | 61 | 6 |

[1] This solution was a solution which contained 0.03 percent by weight pyrethrum and 99.97 percent by weight deodorized kerosene.

Dimethyl sulfoxide, which precedes the Control in Table II, represents a non-effective sulfoxide which is not within the scope of the present invention.

EXAMPLE III

A number of runs were made in which the insecticides of Example I were tested for effectiveness as "knockdown" agents for houseflies. The insecticides were tested at lower concentrations in these runs than in Example I. The runs which are given below as Table III were carried In Table III there are included di-n-heptyl- and crude tert-octyl methyl sulfoxides which are not within the scope of the claims to this invention.

EXAMPLE IV—HOUSEFLY REPELLENCY

A number of runs were made in which the sulfoxides of this invention were tested to determine their repellency to houseflies. Repellency to houseflies was determined by the Sandwich Bait method which is essentially that disclosed by L. D. Kilgore in "Soap," June 1949. In accordance with this method, to a sheet of cardboard were applied two smooth, thin strips of unsulfured molasses about ⅜" wide and 3½" long leaving a margin of at least ¼" all around and a space of at least 1" between the strips. The prepared cardboard strips were then oven dried at 45° C. Strips of highly porous lens paper, 1" by 4" in dimension, were impregnated with the sulfoxide to be tested as a fly repellent by immersing them in an acetone solution containing the desired quantity of the chemical, and then allowing the strips to dry over a period of 2 to 3 hours. An impregnated strip was then superimposed on each strip of molasses and was fastened in place by stapling it in place to the cardboard Table IV

| Run No. | Sulfoxide Employed | Number of Flies Feeding at Indicated Time (Min.) | | | | | | | | |
|---|---|---|---|---|---|---|---|---|---|---|
| | | 5 | 15 | 30 | 45 | 60 | 90 | 120 | 150 | 165 |
| 1 | n-butyl n-octyl | 0 | 0 | 0 | 0 | 0 | 0 | 0 | 0 | 1 |
| 2 | n-decyl ethyl | 0 | 0 | 0 | 0 | 1 | 0 | 1 | 0 | 0 |
| 3 | di-n-amyl | 0 | 2 | 6 | 4 | 9 | 1 | 2 | 1 | 2 |
| 4 | di-n-hexyl | 0 | 1 | 2 | 2 | 1 | 8 | 0 | 0 | 0 |
| 5 | n-amyl n-butyl | 0 | 1 | 1 | 1 | 7 | 9 | 14 | 3 | 2 |
| 6 | n-propyl n-hexyl | 1 | 0 | 3 | 12 | 3 | 9 | 6 | 1 | 4 |
| 7 | methyl n-octyl | 1 | 0 | 11 | 14 | 8 | 9 | 6 | 6 | 6 |
| 8 | n-butyl n-hexyl | 0 | 0 | 0 | 0 | 1 | 1 | 7 | 2 | 8 |
| 9 | n-heptyl n-propyl | 0 | 0 | 0 | 1 | 3 | 1 | 10 | 2 | 2 |
| 10 | ethyl n-octyl | 0 | 0 | 0 | 2 | 0 | 0 | 5 | 4 | 2 |
| 11 | n-butyl n-heptyl | 1 | 0 | 1 | 3 | 2 | 0 | 10 | 5 | 1 |
| 12 | n-amyl n-hexyl | 0 | 1 | 2 | 0 | 4 | 2 | 0 | 3 | 2 |
| 13 | n-octyl n-propyl | 3 | 3 | 3 | 3 | 0 | 0 | 1 | 1 | 6 |
| 14 | n-decyl methyl | 3 | 5 | 6 | 5 | 4 | 5 | 5 | 3 | 4 |
| 15 | n-amyl n-heptyl | 3 | 1 | 1 | 2 | 1 | 0 | 2 | 0 | 3 |
| 16 | methyl n-undecyl | 5 | 5 | 3 | 4 | 2 | 5 | 2 | 9 | 5 |
| 17 | methyl n-nonyl | 0 | 0 | 0 | 0 | 2 | 1 | 3 | 2 | 5 |
| 18 | ethyl n-nonyl | 1 | 0 | 0 | 0 | 1 | 0 | 0 | 0 | 1 |
| 19 | tert-butyl ethyl | 4 | 50+ | 50+ | 33 | 15 | gone | | | |
| 20 | dimethyl | 24 | 50+ | 21 | gone | | | | | |
| 21 | di-n-propyl | 2 | 45 | 21 | gone | | | | | |
| 22 | di-iso-butyl | 2 | 18 | 15 | gone | | | | | |
| 23 | tert-butyl n-butyl | 50+ | 18 | gone | | | | | | |
| 24 | di-n-heptyl | 27 | 12 | 6 | gone | | | | | |
| 25 | tert-octyl methyl | 15 | 28 | 30 | 25 | gone | | | | | backing. The loose fibrous construction of the impregnated lens paper permits the flies to remove the molasses through the paper. The prepared strips were then exposed to about 150 houseflies, musca domestica, over 5 days old, which had been starved for 6 hours. The number of flies feeding on the molasses strips are recorded after 5 and 15 minutes, and each 15 minutes thereafter for 165 minutes. The results of these tests are tabulated below as Table IV. In this table, the word "gone" is used to denote the complete consumption of the molasses. For comparison purposes, the flies will completely consume the molasses in 15 to 30 minutes, and sometimes in as short a time as 5 minutes, when the material is non-repellent or when no repellent has been applied to the lens paper.

EXAMPLE V—ROACH REPELLENCY TESTS

A number of runs were made in which some of the sulfoxides of the present invention were tested for repellency to the American roach. In these runs, an apparatus was used which was made from three 4" by 4" glass cylinders with U-shaped openings to allow free passage of the roaches to any of the cylinders. The three cylinders with openings coinciding were taped together and placed on a piece of window glass to form a bottom. Filter papers were slipped under each cylinder, and 5 roaches were introduced into the cylinders in the evening before the test was to start in the morning so as to give them a chance to become accustomed to new quarters. On the day prior to testing, 11 centimeters diameter filter papers (Whatman No. 40) were dipped in acetone solutions containing 5 percent of the sulfoxide to be tested. At the beginning of the test, the dried, chemically treated papers were substituted for the untreated papers under the outer two cylinders, and a clean untreated paper was placed under the center cylinder. After one hour, readings were taken on the number of roaches on each treated paper and the number on the untreated paper. The roaches were then stirred again to force them to again choose the least objectionable paper. This reading and stirring process was done each hour until 6 hours had elapsed from the beginning of the test. The following day, two readings were taken, 6 hours apart. At the end of the test, the results were recorded as the sum of the number of roaches on each treated paper. Since eight readings were taken in all, and 5 roaches were present during each test, the maximum number which can be reported for a run is 40.

Table V

| Run No. | Sulfoxide Employed | Total Roaches on Chemical |
|---|---|---|
| 1 | Crude sec-octyl ethyl sulfoxide | 0 |
| 2 | Methyl n-nonyl sulfoxide | 4 |
| 3 | n-decyl ethyl sulfoxide | 9 |
| 4 | n-heptyl n-amyl sulfoxide | 12 |
| 5 | n-dodecyl methyl sulfoxide | 0 |
| 6 | 2-ethylhexyl ethyl sulfoxide | 0 |
| 7 | n-decyl methyl sulfoxide | 11 |
| 8 | n-octyl n-propyl sulfoxide | 1 |
| 9 | n-amyl n-hexyl sulfoxide | 0 |
| 10 | n-butyl n-heptyl sulfoxide | 0 |
| 11 | Ethyl n-octyl sulfoxide | 0 |
| 12 | n-heptyl n-propyl sulfoxide | 2 |
| 13 | n-butyl n-hexyl sulfoxide | 0 |
| 14 | Methyl n-octyl sulfoxide | 1 |
| 15 | Ethyl n-heptyl sulfoxide | 8 |
| 16 | n-propyl n-hexyl sulfoxide | 8 |
| 17 | n-amyl n-butyl sulfoxide | 1 |
| 18 | n-amyl n-propyl sulfoxide | 5 |
| 19 | n-heptyl methyl sulfoxide | 14 |
| 20 | Di-n-hexyl sulfoxide | 9 |
| 21 | Di-n-amyl sulfoxide | 3 |
| 22 | n-butyl n-propyl sulfoxide | 12 |
| 23 | n-nonyl ethyl sulfoxide | |
| 24 | Di-n-heptyl sulfoxide | 33 |
| 25 | Dimethyl sulfoxide | 30 |

EXAMPLE VI—STABLE FLY REPELLENCY

A number of the alkyl sulfoxides of the present invention were tested as repellents for the stable fly, Stomoxys calcitrans (Linn). In these tests, organdy bags fabricated from a sheet of organdy 10" square so that one end of the bag is opened, were impregnated with 1 gram of the sulfoxide to be tested dissolved in 6 to 7 milliliters of acetone and were then suspended on a line to dry. After 24 hours, the bags were drawn over the hand and exposed to several thousand hungry stable flies confined in 30" cubical cages. The flies were reared according to the method reported by Campau, Baker and Morrison in "Journal of Economic Entomology," 46, 524 (1953). The time to the first bite was recorded, and if no bites were sustained in 5 minutes, the bag was withdrawn and the procedure repeated the following day. The period of effective repellency was recorded as the number of days from the day the bags were impregnated to the day when the flies bit constantly. Random bites were not considered to show a loss of effective repellency. The results of these tests are expressed below as Table VI.

Table VI

| Sulfoxide Tested | Period of Effective Repellency |
|---|---|
| ethyl n-hexyl | 2 |
| di-n-butyl | 2 |
| n-heptyl methyl | 2 |
| n-amyl n-propyl | 2 |
| n-amyl n-butyl | 2 |
| n-propyl n-hexyl | 2 |
| ethyl n-heptyl | 2 |
| methyl n-octyl | 2 |
| di-n-amyl | 5 |
| n-butyl n-hexyl | 6 |
| n-heptyl n-propyl | 7 |
| ethyl n-octyl | 6 |
| 2-ethylhexyl ethyl | 3 |
| methyl n-nonyl | 8 |
| sec-octyl ethyl (crude) | 6 |
| n-butyl n-heptyl | 10 |
| n-amyl n-hexyl | 10 |
| n-octyl n-propyl | 7 |
| n-decyl methyl | 2 |
| n-nonyl ethyl | 9 |
| di-n-hexyl | 5 |
| di-n-propyl | 1 |
| tert-butyl ethyl | 1 |
| diisobutyl | 1 |
| tert-butyl n-butyl | 1 |
| tert-octyl methyl | 1 |
| di-n-heptyl | 1 |
| di-n-octyl | 1 |

It will be noted that Table VI includes compounds not falling within the scope of the formula of the claims. These are at the end of the table.

The preceding examples clearly demonstrate the superiority of the insect-combating agents of this invention. For example, the first six runs of Table I, representing "knock-down" agents of this invention, are much superior to the "knock-down" agents of the last six runs, representing controls. Similarly, Example II demonstrates the ineffectiveness of dimethyl sulfoxide as a pyrethrum synergist, and points out the excellent results obtained with the dialkyl sulfoxides of this invention. Again in Example III, the last two runs, control runs, are greatly inferior to the preceding runs which represent the "knock-down" agents within the scope of this invention. In Example IV, a comparison of runs 1 through 18, representing the invention, with runs 19 through 25, control runs, will again demonstrate the superiority of the sulfoxides of this invention as housefly repellents. Runs 1 through 23 of Table V demonstrate the effectiveness of the sulfoxides of this invention as roach repellents, and it is clearly shown that the compounds following, which are not in the scope of this invention, that is, runs 24 and 25, are ineffective for this purpose. It is also shown by comparing the first 21 runs of Table VI, representing the invention, with the remainder of the runs, control runs, that the sulfoxides of this invention are excellent repellents for stable flies. One skilled in the art using the above data can readily select the sulfoxide for most effective results in a given application.

Generally speaking, the sulfoxides discussed herein have a fairly low toxicity. The sulfoxides of this invention were fed to chickens by formulating chicken feed containing one-half percent by weight of one of the sulfoxides described herein. There were no noticeable effects on the chickens' health or rate of growth after feeding these compositions to the chickens for periods up to about one month. One of the sulfoxides having been noted to have produced irritation of the human skin, the reader is cautioned to exercise routine precautions in dealing with these materials.

Reasonable variation and modification are possible within the scope of the foregoing disclosure and the appended claims to the invention, the essence of which is that certain selected alkyl sulfoxides have been discovered to be excellent insecticides, additives for insecticidal compositions, said sulfoxides possessing excellent knockdown properties and possessing also a repelling action, as described.

We claim:

1. A method of combating an insect which comprises applying to the place at which said insect is to be combated a composition containing 0.25 to 15 percent by weight of the total composition of a compound having the following structural characteristics:

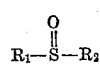

wherein $R_1$ is an n-alkyl radical having 1–12 carbon atoms, $R_2$ is a radical selected from the group consisting of n- and secondary alkyl radicals having 1–8 carbon atoms and wherein the total carbon atoms in $R_1$ and $R_2$ are in the range 7–13 inclusive, the said compound being suspended in an insect-combating adjuvant.

2. A composition for combating insects comprising pyrethrum and 0.25 to 5 weight percent based on the total composition, of a compound having the following structural characteristics:

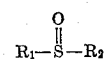

wherein $R_1$ is an n-alkyl radical having 1–12 carbon atoms, $R_2$ is a radical selected from the group consisting of n- and secondary alkyl radicals having 1–8 carbon atoms and wherein the total carbon atoms in $R_1$ and $R_2$ are in the range 7–13 dispersed in an insect-combating adjuvant.

3. A method according to claim 1 wherein the composition contains 1 to 5 weight percent of said compound.

4. A method of combating an insect which comprises subjecting said insect to an effective quantity of a compound having the following structural characteristics

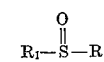

wherein $R_1$ is an n-alkyl radical having 1–12 carbon atoms, $R_2$ is a radical selected from the group consisting of n- and secondary alkyl radicals having 1–8 carbon atoms and wherein the total carbon atoms in $R_1$ and $R_2$ are in the range 7–13 inclusive.

5. A method of combating an insect which comprises subjecting said insect to an effective quantity of n-butyl n-propyl sulfoxide.

6. A method for repelling an insect which comprises subjecting said insect to an effective amount of a solution or dispersion containing, based upon the weight of the composition, 0.5–10 weight percent of a compound having the following structural characteristics

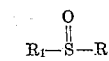

wherein $R_1$ is an n-alkyl radical having 1–12 carbon atoms, $R_2$ is a radical selected from the group consisting of n- and secondary alkyl radicals having 1–8 carbon atoms and wherein the total carbon atoms in $R_1$ and $R_2$ are in the range 7–13 inclusive.

7. A method for combating insects within a confined space which comprises applying to said space a compound having the following structural characteristics

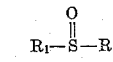

wherein $R_1$ is an n-alkyl radical having 1–12 carbon atoms, $R_2$ is a radical selected from the group consisting of n- and secondary alkyl radicals having 1–8 carbon atoms and wherein the total carbon atoms in $R_1$ and $R_2$ are in the range 7–13 inclusive.

8. A method of decreasing the amount of pyrethrum required in an insect combating composition which comprises replacing at least a portion of the pyrethrum with a compound selected from the group of compounds having the following structural characteristics

wherein $R_1$ is an n-alkyl radical having 1–12 carbon atoms, $R_2$ is a radical selected from the group consisting of n- and secondary alkyl radicals having 1–8 carbon atoms and wherein the total carbon atoms in $R_1$ and $R_2$ are in the range 7–13 inclusive by first determining the amount of pyrethrum in said insect combating composition and then replacing at least a portion thereof with a compound as stated herein.

9. A method of knocking down an insect which comprises applying to said insect an effective amount of a knockdown material comprising an appreciable amount of a compound having the following structural characteristics

wherein $R_1$ is an n-alkyl radical having 1–12 carbon atoms, $R_2$ is a radical selected from the group consisting of n- and secondary alkyl radicals having 1–8 carbon atoms and wherein the total carbon atoms in $R_1$ and $R_2$ are in the range 7–13 inclusive.

10. A method for repelling flies, such as house flies and stable flies, which comprises applying at the locus from which said flies are to be repelled an effective amount of a solution or dispersion containing, based upon the weight of the composition, 0.5–10 weight percent of a compound having the following structural characteristics

wherein $R_1$ is an n-alkyl radical having 1–12 carbon atoms, $R_2$ is a radical selected from the group consisting of n- and secondary alkyl radicals having 1–8 carbon atoms and wherein the total carbon atoms in $R_1$ and $R_2$ are in the range 7–13, inclusive.

11. A method of repelling roaches which comprises applying to the locus from which said roaches are to be repelled an effective amount of a solution or dispersion containing, based upon the weight of the composition, 0.5–10 weight percent of a compound having the following structural characteristics

wherein $R_1$ is an n-alkyl radical having 1–12 carbon atoms, $R_2$ is a radical selected from the group consisting of n- and secondary alkyl radicals having 1–8 carbon atoms and wherein the total carbon atoms in $R_1$ and $R_2$ are in the range 7–13, inclusive.

12. A method of combatting an insect with comprises subjecting said insect to an effective quantity of ethyl n-hexyl sulfoxide.

13. A method of combatting an insect which comprises subjecting said insect to an effective quantity of di-n-butyl sulfoxide.

14. A method of combatting an insect which comprises subjecting said insect to an effective quantity of n-heptyl methyl sulfoxide.

15. A method of combatting an insect which comprises subjecting said insect to an effective quantity of n-amyl n-propyl sulfoxide.

16. A method of combatting an insect which comprises subjecting said insect to an effective quantity of n-amyl n-butyl sulfoxide.

17. A method of combatting an insect which comprises subjecting said insect to an effective quantity of n-propyl n-hexyl sulfoxide.

18. A method of combatting an insect which comprises subjecting said insect to an effective quantity of ethyl n-heptyl sulfoxide.

19. A method of combatting an insect which comprises subjecting said insect to an effective quantity of methyl n-octyl sulfoxide.

20. A method of combatting an insect which comprises subjecting said insect to an effecitve quantity of di-n-amyl sulfoxide.

21. A method of combatting an insect which comprises subjecting said insect to an effective quantity of n-butyl n-hexyl sulfoxide.

22. A method of combatting an insect which comprises subjecting said insect to an effective quantity of n-heptyl n-propyl sulfoxide.

23. A method of combatting an insect which comprises subjecting said insect to an effective quantity of ethyl n-octyl sulfoxide.

24. A method of combatting an insect which comprises subjecting said insect to an effective quantity of 2-ethyl-hexyl ethyl sulfoxide.

25. A method of combatting an insect which comprises subjecting said insect to an effective quantity of methyl n-nonyl sulfoxide.

26. A method of combatting an insect which comprises subjecting said insect to an effective quantity of sec-octyl ethyl (crude) sulfoxide.

27. A method of combatting an insect which comprises subjecting said insect to an effective quantity of n-butyl n-heptyl sulfoxide.

28. A method of combatting an insect which comprises subjecting said insect to an effective quantity of n-amyl n-hexyl sulfoxide.

29. A method of combatting an insect which comprises subjecting said insect to an effective quantity of n-octyl n-propyl sulfoxide.

30. A method of combatting an insect which comprises subjecting said insect to an effective quantity of n-decyl methyl sulfoxide.

31. A method of combatting an insect which comprises subjecting said insect to an effective quantity of n-nonyl ethyl sulfoxide.

32. A method of combatting an insect which comprises subjecting said insect to an effective quantity of di-n-hexyl sulfoxide.

33. A method of combatting an insect which comprises subjecting said insect to an effective quantity of n-butyl n-octyl sulfoxide.

34. A method of combatting an insect which comprises subjecting said insect to an effective quantity of n-heptyl n-amyl sulfoxide.

35. A method of combatting an insect which comprises subjecting said insect to an effective quantity of methyl n-undecyl sulfoxide.

36. A method of combatting an insect which comprises subjecting said insect to an effective quantity of n-decyl ethyl sulfoxide.

37. A method of combatting an insect which comprises subjecting said insect to an effective quantity of n-dodecyl methyl sulfoxide.

References Cited in the file of this patent

UNITED STATES PATENTS 2,654,667   Goodhue et al. _____ Oct. 6, 1953

OTHER REFERENCES

U.S.D.A., Bur. of Entomology and Plant Quarantine Bull. No. E-585, January 1943, pp. 1 and 11.

U.S.D.A. Circular No. 523, May 1939, pp. 1, 2, 3 and 6.

Wadley: "The Evidence Required to Show Synergistic Action of Insecticides and a Short Cut in Analysis," U.S.D.A., June 1945, pp. 1–7.